Oct. 11, 1949.                R. T. HEDFIELD                2,484,090
                          MULTIPLE-CAPACITY SPOOL
                           Filed Sept. 18, 1946
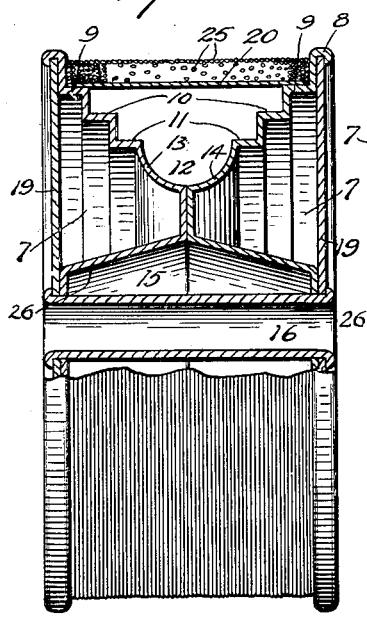
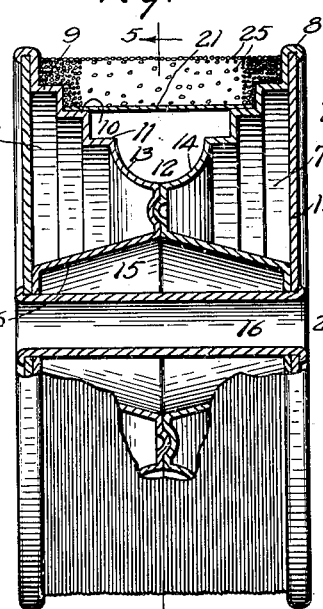
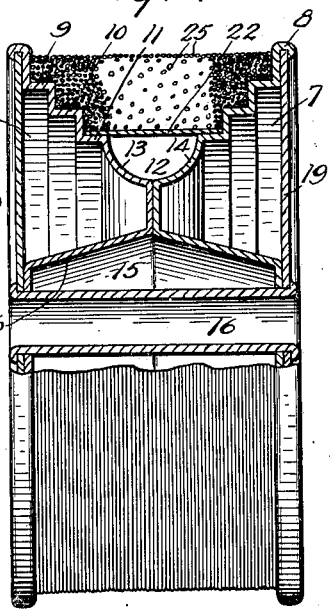
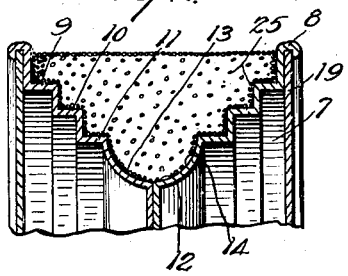
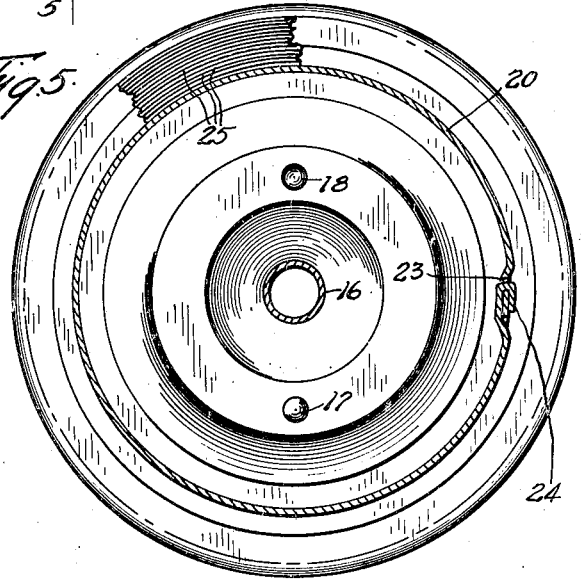
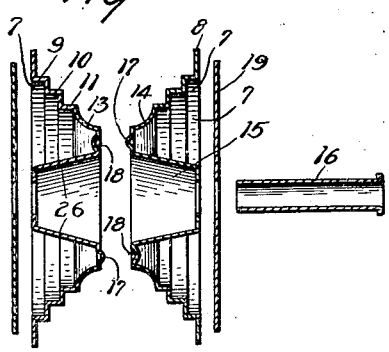
INVENTOR.
Reynold T. Hedfield.
BY
Thiess, Olson + Mecklenburger.
Attys.

Patented Oct. 11, 1949

2,484,090

UNITED STATES PATENT OFFICE 2,484,090

MULTIPLE-CAPACITY SPOOL

Reynold T. Hedfield, Madison, Wis.

Application September 18, 1946, Serial No. 697,672

3 Claims. (Cl. 242—118)

1

The present invention relates to a multiple-capacity spool, of the type which is particularly adapted to the reception of new and used fish-line.

The present application is a continuation-in-part of my previous application Serial No. 592,015, filed May 4, 1945.

Fish-line, as manufactured and sold, is usually wound upon plain wooden spools having very shallow winding grooves which are usually just deep enough so as to contain the desired length of line, being so proportioned that the last winding level of the line is substantially flush with the rim of the spool. Inasmuch as these lines are wound mechanically by the manufacturer, each turn lies accurately upon the one below it and the line is very tightly wound, the end being finally fastened to the edge of the spool, so that the entire package presents a pleasing appearance.

When such a line, however, is unwound from its original spool, as for instance upon a casting reel attached to a fishing rod, the spool is usually preserved by the fisherman with the idea of furnishing convenient means on which to store the line at the end of the season or whenever it is not in use, particularly if a line of a different weight is to be placed upon the reel. The fisherman soon discovers that it is impossible again to wind all of the line into the shallow groove of the spool provided by the manufacturer. First of all, the average fisherman has no means of accurately tracking the line so that each turn will lie above the other, nor has he the means for putting the line under tension. As a result the line, when rewound upon the original spool, occupies a much larger space, and therefore protrudes beyond the ends of the spool, from which it is hence easily displaced to become entangled and snarled.

Of course spools of different depths are in existence, and it is quite possible that a fisherman may have among his outfit, say, a spool that had 200 yards of line on it, and another on which may have been only 50 yards of line, and self-evidently he could rewind the 50 yards of line on to the empty 200 yard line spool, but he could not put the 50 yards bank on to the empty spool upon which it came.

2

In order to avoid these inconveniences, my invention relates to a spool which, while it has the conventional size and outside appearance, yet is so constructed that, after removal of the line, the spool can be altered so that it will receive, upon rewinding, the entire length of the line. This is accomplished by providing spools which have a very deep groove, in any event much deeper than that customarily used, and which is capable of holding quite a large amount of line when the same is again wound thereon, the deeper portions of the groove being covered by a temporary spanning-band.

The improved spool of the present invention is preferably made from two corresponding congruent parts, which when interfitted or assembled provide a preferably cylindrical spool having a deep groove whose internal width is progressively and decrementally diminished by providing a plurality of annular shoulders of progressively smaller diameters, with a deep semi-annular groove at the deepest part of the groove, and with temporary spanning bands on one or more of the said shoulders.

Among the objects of the invention are:

To provide a readily assembled and inexpensive spool which may contain initially a relatively small amount of tightly wound fish-line, but which, after removal of the line may be readily altered by the user so as to become capable of receiving the same line when wound thereon by hand.

To provide a fish-line spool that can be wound by the manufacturer with a predetermined amount of such line, and give the appearance of a full spool, but which still has ample capacity for re-winding the line thereon after it has been used.

My invention is illustrated by an accompanying drawing in which

Fig. 1 is a frontal elevational view, partly in section, of a spool having a minimum amount of line thereon;

Fig. 2 is a similar view of a modification, showing a larger amount of line thereon;

Fig. 3 is a similar view to Fig. 1, but showing a still larger amount of line thereon;

Fig. 4 is a vertical sectional view of a part of a spool, with a full amount of line wound thereon;

Fig. 5 is a vertical sectional view of the spool along line 5—5 of Fig. 2; and

Fig. 6 is a cross section, on a somewhat smaller scale, of the empty spool shown in exploded form and with the parts still unassembled.

One of the outstanding features of the spool of the present invention is the utilization of two similar but interfittable or congruent parts which may be formed from any suitable material such as a plastic, or, preferably of metal; particularly of the type which lends itself to a drawing and stamping operation.

The two parts are entirely similar and each consists of a sheet of material which has been stamped or otherwise formed into a cylindrical body 7 consisting of a circular peripheral flange 8 and a series of annular shoulders 9, 10, 11 of progressively diminished diameters. There also is a centrally located semi-annular groove 12 made up of two quarter-annular depressed portions 13, 14. The central portion of the main body of the spool is in the form of a barrel 15 having reinforcing hub members 26, there being holes in the center of each of the halves of the spool through which a hollow tubular rivet 16 is passed. The hub members greatly strengthen the construction, as in abutting against each other they provide a truss-like arrangement that prevents the side walls 19 from being pushed inwardly.

To prevent relative movement between the two parts of the spool I may provide interlocking male and female parts, such as the protuberance 17 and corresponding depression 18 into which the former extends when the spool is assembled. These interlocking parts may, however, be omitted, as shown in Figs. 1, 3, 4 and 5. The peripheral flange 8 of the spool is crimped about the edge of the circular side walls or spool-ends 19.

Temporary spanning bands 20, 21, 22 may be inserted in the groove at varying depths, resting for example on the outermost shoulder 9 (Fig. 1), the next lower shoulder 10 (Fig. 2), or the innermost shoulder 11 (Fig. 3). These readily removable spanning bands may be made of any suitable material, such as metal, plastics, cardboard, etc., and are preferably united at their ends as clearly shown in Fig. 5, there being a slit 23 in one end of the spanning band and a corresponding tongue 24 which, after being passed through the slit, is bent back upon the band 20 itself.

Fish-line 25 is shown wound on the bands shown in Figs. 1, 2, 3 and 4, the amounts varying in increasing order. In Fig. 4 the entire groove is occupied by fish-line. The bands used are just wide enough comfortably to lie within the groove while supported upon opposed shoulders having the same diameter. It is intended that the fish-line originally be wound tightly upon the supporting spanning band, and that the user, after removing the line to his reel, may then remove the spanning band and thus render the spool capable of receiving the line at some future time, with assurance that it may all be wound thereon without extending beyond the edges of the spool. Suitable indicia printed upon the bands may give directions for doing this.

The spool may be made up from three different parts, two of two types, and one of another being required. Thus the method of assembly can best be understood from a study of Fig. 6. Two main body portions 7 are provided, being preferably stamped from some suitable sheet material, such as metal or plastic. If made from the latter, they might be molded either by compression or injection molding. The two parts are exactly alike, and may be, as shown, provided with the outwardly extending boss 17 and the depression 18. Two bosses and two depressions may be provided on each body member. By turning the members either 90° or 180° on their transverse axis, bosses and depressions may be brought into juxtaposition.

The circular side walls 19 are then placed in position, whereafter the central tubular rivet 16 is pushed through the assembly and then crimped into place. One end of this rivet could be pre-crimped, as shown in Fig. 6. The peripheral portions of the side of the body portions are then crimped about the edges of the circular side walls, eventuating the completed spool, as, for example, shown in Fig. 2.

When made, for example, from sheet aluminum or from a light colored plastic material, the spools constructed in accordance with the present invention present a very pleasing appearance, and form a most useful article, as, in counter-distinction from the old type of fish-line spools, they may be used for rewinding the line thereon after removal of the spanning band.

Other means of fastening the various parts together, such as by riveting, the use of suitable adhesives, welding, fusing together (as is possible with some types of thermoplastic materials) etc., are to be considered as with the scope of the present invention. While the spool has been shown as cylindrical, it is obvious that it could be elliptical or even square or oblong, and still come within the scope and purport of the claims hereinbelow; hence when referring to the use of "annular" shoulders, it is not to be considered that these must necessarily be a circular ring.

I claim:

1. A fish-line spool comprising a cylindrical body portion provided with a deep circumferential groove whose interior dimensions are defined by a series of sets of inwardly stepped opposed annular shoulders of progressively diminished diameter, and a readily removable circumferential band supported on one of said sets of opposed shoulders, the removal of said band exposing the entire depth of said groove.

2. A fish-line spool comprising a cylindrical body portion provided with a deep circumferential groove progressively diminishing in cross-section and defined by opposed sets of inwardly stepped annular shoulders of progressively diminishing diameter and having a substantially semi-annular bottom; and a readily removable band supported on one of said sets of annular shoulders, the removal of said band exposing said semi-annular bottom of the groove.

3. A fish-line spool comprising two stamped cylindrical metal shapes having opposed pairs of inwardly stepped annular shoulders of progressively diminished diameters and secured together by a centrally located tubular rivet, thereby providing between them a deep annular groove becoming progressively and decrementally narrower as it increases in depth, circular concealing members secured to the outside of said cylindrical shapes, a readily removable annular spanning band lying within said groove and supported on an opposed pair of shoulders having the same diameter, and opposed internal truss-like hub members bearing with their ends respectively against the concealing members and against each other, whereby inward movement of the ends is effectively prevented.

REYNOLD T. HEDFIELD.

REFERENCES CITED

The following references are of record in the file of this patent:

UNITED STATES PATENTS

| Number | Name | Date |
|---|---|---|
| 384,328 | Millar | June 12, 1888 |
| 1,527,478 | Harper | Feb. 24, 1925 |
| 1,591,771 | Batchelor | July 6, 1926 |
| 1,662,238 | Davis | Mar. 13, 1928 |
| 1,700,181 | Russell | Jan. 29, 1929 |
| 1,819,337 | Pevear | Aug. 18, 1931 |
| 1,981,809 | Muller | Nov. 20, 1934 |
| 2,339,688 | Eisenbeis | Jan. 18, 1944 |
| 2,344,665 | Adams | Mar. 21, 1944 |
| 2,392,492 | Morgan et al. | Jan. 8, 1946 |

FOREIGN PATENTS

| Number | Country | Date |
|---|---|---|
| 1,579 | Great Britain | Jan. 26, 1892 |